United States Patent [19]
Humphrey

[11] Patent Number: 5,017,374
[45] Date of Patent: May 21, 1991

[54] CROP GROWTH PROMOTION
[75] Inventor: Robert E. Humphrey, Aylmer, Canada
[73] Assignee: Agro Elements, Toronto, Canada
[21] Appl. No.: 182,007
[22] Filed: Apr. 15, 1988
[51] Int. Cl.$^5$ .................. A01N 63/00; A01C 1/06; C12N 1/14; C12N 1/16; C12N 1/18; A61K 37/54
[52] U.S. Cl. .................................. 424/93; 47/57.6; 47/DIG. 9; 435/254; 435/255; 435/256; 435/940; 435/942; 424/94.61; 424/94.63
[58] Field of Search .............. 424/93, 94.61, 94.63; 71/11; 47/57.6, 58, DIG. 9; 435/254, 255, 256, 940, 942

[56] References Cited
FOREIGN PATENT DOCUMENTS
1091056 12/1980 Canada .

OTHER PUBLICATIONS
Newsted et al., 1985, Can. J. Bot. 63(12): 2311-2318.
Handoo et al. 1979, Seeds Research 7(2): 151-156.
Norton et al., 1985, Can. J. Bot. 63(6): 1040-1045.
Takeda Chemical Industries, 1981, Chem. Abstr. 94(11): #82202v.
Humphrey, R., 1981, Chem. Abstr. 94(11): #82989g.

*Primary Examiner*—Elizabeth C. Weimar
*Assistant Examiner*—David T. Fox
*Attorney, Agent, or Firm*—Foley & Lardner

[57] ABSTRACT

This invention relates to a seed dressing material for application to seeds of plants adapted to be grown in an environment with or without legume-growth-factor, to enhance the trace mineral uptake or growth of the plants. This material comprises effective amounts of fungal spores of the family Coprinus, preferably spores of *Coprinus comatus,* and a further ingredient selected from GTF chromium and yeast, or combinations thereof. The plants resulting from the growth of seeds treated with the dressing material of this invention reach maturity faster, and have increased contents of zinc and chromium, both necessary dietary trace elements for mammals.

13 Claims, No Drawings

CROP GROWTH PROMOTION

FIELD OF THE INVENTION

This invention relates to agricultural processes, and compositions for use in agriculture. More specifically, it relates to seed dressing compositions for application to agricultural crop seeds prior to planting for enhancement of the growth of crops therefrom, and to processes for modifying the growth environment of crops, to promote the growth thereof.

BACKGROUND OF THE INVENTION AND PRIOR ART

Crops such as corn and soybeans are grown in North America primarily to provide a source of animal feed. The flesh and other products from the animals eventually provide a major source of nutritional human food. Accordingly, not only is it desirable to promote the rate of growth of plants and the quantity of edible feed which such plants will yield, but also it is desirable to ensure that such plants contain quantities of trace elements required for good human diet.

It is known that a variety of trace elements should be present in human foodstuffs, to provide a healthy, balanced diet. For example, a certain minimum level of chromium is desirable. For animal metabolism, chromium has to be incorporated in a tetra-aquo-dinicotinato compound, called glucose-tolerance-factor (GTF). Chromium GTF is metabolized in a different way from inorganic chromium.

Chromium plays a role of considerable significance in glucose metabolism and in cardiovascular disease. A number of therapeutic trials of human dietary chromium supplementation have indicated that chromium deficiency can be a cause or an aggravating factor in the glucose intolerance of infants suffering from protein calorie malnutrition, of maturity-onset diabetics, and of middle-aged and elderly subjects. It has been found that the diets of North American residents tend to be deficient in chromium, to some extent because a significant constituent of their diet is the meat of animals which have been corn fed, many of the high yielding corns traditionally being short of chromium.

Zinc is another trace element which is essential in human diets, in a least a certain minimum level. Zinc deficient diets lead to anorexia, lack of growth, and teratogenesis. Zinc is involved in protein synthesis. Its deficiency in human diets is relatively common.

The presence of zinc in the soil of the growing environment is known to affect the growth of corn. Literature has taught that if the soil has a zinc deficiency, then corn plants grown therein tend to be stunted, and exhibit leaf, stem and root abnormalities. Zinc deficiency in germinating seeds is especially acute as the seed must carry its entire complement of zinc if it is to experience growth at temperatures below 17° C. Zinc deficiency may lead to the death of the plant before the soil warms up. The application of certain phosphorus-rich fertilizers is known to cause zinc deficiency in plants. Loneragan et al. (1982), who studied this zinc-phosphorus relationship, observed that under conditions of high phosphorus supply and low zinc supply phosphorus is absorbed by the roots and transported in such excess that it becomes toxic and produces symptoms resembling zinc deficiency, while not changing the zinc concentration in the plant tops. Singh et al. (Agronomy Journal, Vol. 78, July-August, 1986) have suggested that increased phosphorus levels may lead to this reduced zinc uptake via a biological route, namely the reduction of vesicular-arbuscular-mycorrhizal (VAM) infection of the plant. Consequently, many commercially available fertilizers contain added zinc so as to ensure that the soil of the growing environment is sufficiently rich in zinc prior to planting. The presence of adequate total concentrations of zinc in the soil of the growing environment does not; however, necessarily mean that a growing plant will take up the zinc to the most beneficial extent. Marginal zinc deficiency often goes undetected, but can have a drastic effect on plant growth.

Mycorrhizal fungi are a special type of fungus commonly present in the soil which penetrate the root cortex of their specific host plant and subsequently enter into a symbiotic relationship with the plant. In this relationship most but not all nutrients essential to the fungus are exuded from the plant membranes to the fungus, e.g., glucose and amino acids, and conversely, minerals such as phosphorus, potassium, zinc, calcium, copper, iron, magnesium, and manganese, are gathered up and delivered to the plant by the mycorrhiza in a more effective and economic manner than the plant could have gathered alone.

Hairs called hyphae grow out of the mycorrhiza and associate with the plant root in arbuscules or tree-like structures at which the nutrient exchange occurs. The hyphae also extend into the soil to gather up trace minerals.

There are many varieties of mycorrhiza indigenous to soil, and each is specific for a particular host. Researchers have attempted to inoculate soil with a given beneficial mycorrhizal fungus corresponding to a particular plant. These attempts have met with little success, as these inoculated varieties lose out in biological competition to the less effective indigenous mycorrhiza. Accordingly, no enhancement of growth is demonstrated unless the soil is presterilized. A further problem is that mycorrhizal fungi suitable for enhancing growth of crops are not, as far as is known, lab-culturable. This makes their isolation extremely tedious and costly.

It would be beneficial to the plant that the number of host-specific mycorrhiza be increased in the vicinity of the seeds and later the roots, as these fungi increase the uptake of trace minerals to the plant.

It is known that germinating seeds, in addition to producing amino acids and glucose, produce and exude two volatile compounds, acetaldehyde, a growth retardant, and ethanol, a growth enhancer. Norton and Harmon (Canadian J. Bot, Vol. 63, 1985) found that exposure to the volatiles from aged pea seeds stimulated soil microbial activity. Hyphae grew out from the mycorrhizal organisms preferentially towards the ethanol exuded from the aged pea seeds. Ethanol enhances the growth of free-living rhizobia.

It is an object of this invention to provide novel beneficial seed dressing compositions for application to crop seeds, to enhance symbiotic microbial benefit with a sugar environment around the seed and GTF chromium as a nutrient to promote fungi growth and ethanol production.

It is a further object to provide a novel process for growing agricultural crops.

SUMMARY OF THE INVENTION

The present invention is based upon the discovery that the presence, in the growing soil environment of cereal crop plants adapted to be grown in an environment containing or not containing legume growth factor, of spores of a fungus of a member of the Coprinus family and either GTF chromium or yeast or combinations thereof, exerts beneficial effects on the growth characteristics of cereal crop plants. Plants grown in such a soil environment exhibit faster rates of growth to maturity, increased contents of beneficial trace elements, especially zinc and phosphorus and grain chromium, higher yields and a reduction in moisture content.

Whilst it is not intended that this invention should be limited to any particular theory of the mode of its operation or scientific basis, it is believed that the aforementioned items of the soil growth environment operate together to increase the number and activity of the appropriate mycorrhizal bacteria in the soil with respect to crop growth rate and zinc and phosphorus assimilation. More specifically, it appears that these items lead to enhanced ethanol production in the soil, probably as a result of the fermentation of cellulosic residues and/or glucose plant exudate in the soil by Coprinus spores, thereby stimulating microorganism growth such as free living rhizobia and mycorrhiza. Moreover, it appears to overcome the aforementioned phosphorus-zinc antagonism, probably as a result of stimulated mycorrhizal activity, so that efficient uptake of both phosphorus and zinc is experienced by the plant. As a result, the need for application of phosphorus containing fertilizer can be reduced or even eliminated.

The plants grown according to the present invention also yield seeds containing increased zinc contents. In fact, the zinc content of such seeds is often sufficient to supply the entire need for zinc in the growing environment of such seeds. This is important since, at temperatures below about 17° C., growing seeds are unable to assimilate zinc from the soil environment and must rely on their own zinc content to supply zinc to the growing plant. Temperatures below 17° C. are commonly encountered during growing seasons in temperate climates. Seeds derived from plants grown according to the present invention can thus be grown to provide plants which do not suffer from zinc deficiency as a result of encountering low growing temperatures.

A further advantage deriving from the practice of the present invention is a reduction in the requirement for tillage (ploughing) of the growth soil. Once a crop has been grown according to the present invention, and harvested, so that the crop has been established in the field, a subsequent crop of a legume or similar species can be grown in the same field without tillage. This reduction in tillage is beneficial in reducing the extent of soil erosion.

The term "legume-growth-factor" referred to herein was coined by Agriculture Canada after its discovery in the soil surrounding the roots of leguminous plants, and describes a hereto incompletely characterized entity or composition of microorganisms. This legume-growth-factor enhances the growth of non-leguminous as well as leguminous plants, although it is with the latter that it is naturally associated and from which it is obtained. For purposes of this invention, it is easiest used in the form of soil obtained from the roots of leguminous plants, preferably soybeans without attempting to isolate it from the soil.

The present invention thus provides, from a first aspect, a seed dressing material for application to seeds of plants to be grown in soil containing plant assimilable zinc and legume-growth-factor, to enhance growth thereof and/or trace mineral uptake therein, comprising effective amounts of fungal spores of at least one fungus of the family Coprinus, and a further ingredient selected from yeast and GTF chromium, or combinations thereof.

From a second aspect, the invention provides a process of enhancing the growth and characteristics of cereal crop plants, which comprises growing the plant crops from seeds in a soil environment Which includes effective amounts of fungal spores of a fungus of the family Coprinus, legume-growth-factor, in the earth or mulch, and a further ingredient selected from yeast concentrate containing GTF chromium, or combinations thereof.

The legume-growth-factor may be indigenous to the soil in which the plants are grown, or may be added thereto as seed dressing or by soil inoculation.

PREFERRED EMBODIMENTS

The present invention is best put into practice as a seed dressing material, in which Coprinus spores and GTF chromium are formed into a mixture, optionally with carriers, in controlled amounts, ready for application to crop seeds, such as corn, prior to planting. In such a manner, sufficient and controlled relative amounts of ingredients, even very small relative amounts thereof, can be applied. The use of a seed dressing including all of the specified ingredients ensures their availability in the growth environment, even though limited supplies of some of them may be available from the soil itself.

In a preferred form of this invention, the fungal spores for inclusion in the seed dressing material are those from *Coprinus comatus*, commonly known as shaggy-mane mushroom, or from *Coprinus micaceus*. However, the present invention is not limited to the use of such fungal spores, and substantially any fungal spores which are easy to grow in quantity under temperate conditions on decaying or living plant matter are useful.

GTF chromium is a known, commercially available material, manufactured by Granulation Technologies Incorporated, New Jersey, U.S.A. This organic complex is formed by the addition of inorganic chromium to yeast cells. Chemically, it is reported to be tetra-aquo-dinicotinato-chromium.

The yeast for use in the compositions of the present invention may be any conventional baker's or brewer's yeast. Non-limiting examples of appropriate yeasts include those of the genus Saccharomyces, in particular *S. cerevisiae*, *S. bailii* and *S. rouxii*. One of the many yeasts that may be used is produced under the name "Allyeast" by Alltech Biotechnology Centre, Kentucky, U.S.A.

Legume-growth factor, hereinabove described, is an as yet incompletely identified microorganism or group of microorganisms which has the effect of enhancing the growth of legumes, for example soybeans, alfalfa, clover, and beans. It is found in soils in which legumes have been grown. For purposes of the present invention, it is best to use soil which adheres to the legume plant root when the plant is removed from its growth environment, and this earth is difficult to remove from the root even by vigorous shaking. This soil contains the required legume-growth-factor and can be used as a soil dressing ingredient. However, the present invention is not limited to the use of legume-growth-factor in an association with soil, and legume-growth-factor isolated by any appropriate technique may be used. When the soil for the cereal crop has previously supported the growth of a legume such as soybeans, alfalfa, clover or beans, it contains sufficient legume-growth-factor for purposes of the present invention. It is still, however, preferred to include legume-growth-factor in the seed dressing composition when used on a non-recent legume growing soil.

Appropriate amounts of fungal spores for incorporation into the seed dressing material are from about 200,000,000 to 300,000,000 per 25,000 seeds (sufficient for planting one acre). Most preferably, about 250,000,000 spores per 25,000 seeds are used.

The GTF chromium is available as a concentrate, containing 2,000 micrograms of GTF chromium per gram, and preferably 50–100 grams of such a concentrate should be applied to the seeds for planting one acre. Where the chromium is to be supplied through the addition of a yeast, the following technique should be used. Where air is the seed-selecting and/or transport agent, the yeast is mixed in 10 ounces of cornstarch paste per 80,000 kernels of corn and allowed to dry on the seed for two hours. When the seed selection is not air, the yeast may be applied dry. Two ounces of graphite is preferred as an additive for lubricating the seed.

Appropriate amounts of the legume-growth-factor to be added depend on the content naturally present in the soil to be planted. Legume-growth-factor may be coated on the seed with mud from LGF soil up to 24 ounces per 80,000 corn seeds.

The seed dressing material of this invention may be applied to the seeds in conjunction with a suitable carrier. Suitable carriers for seed dressings are well known in the art and include substantially any inert, environmentally harmless substance which will not adversely affect the performance of any of the active ingredients and will not damage the seeds or growing plant roots. Cornstarch and graphite are typical specific examples of carriers. Preferably, enough carrier is present to produce a usable paste in 10 oz. of water for 80,000 seeds.

Since the purpose of the invention is to enhance mycorrhizal activity, then the addition of phosphorus is to be so limited that the plant will exude nutrients to enhance the fungal growth to make phosphorus available. In a low to medium phosphorus soil, 50 lbs. per acre of monosodium phosphate is adequate. When the rating for phosphorus is high, the addition of phosphorus is counterproductive. To the phosphorus may be added 100 grams of copper 100 grams of boron and 500 grams of zinc. Copper correlates with chromium and copper and chromium together is known as a systemic fungicide (although toxic where inorganic chromium is used). Boron is often in deficiency in a drought situation especially in a high fertility soil such as this invention produces. In the corn grown using this process, it is found that the chromium content in the seed correlates negatively with corn ear mould and also that the application of copper to the soil reduces ear mould.

In a further embodiment, yield of the plants treated with the compositions of the present invention may be further improved by the use of an energy source or by an enzyme which enhances the activity of the yeast. Preferably, the energy source is molasses added as 2 liters per 25,000 seeds dribbled on the seed in a water-thinned solution as the seed is planted. Molasses added to the seed treatment will dry in about 5 hours so that no seed stickiness is apparent. Preferably, the enzyme is selected from the group comprising amylases, proteases, or cellulases or combinations thereof. One of the many enzyme formulations that may be used is produced under the name "Allcoholase II" by Alltech Biotechnology Centre, Kentucky, U.S.A.

To be most effective, the compositions of the present invention should be used on seeds in post-legume soil where herbicide has not been used to kill the legume. This does not rule out continuous corn ground where improved yields and higher chromium grain content is occurring.

The dressing material of this invention may be applied to the seeds of any agricultural crop. Especially beneficial results are obtained with corn crops.

The result of the use of the seed dressing according to the invention appears to be an enhanced, beneficial mycorrhizal population in the growing environment. This explosion of the beneficial mycorrhizal population, and the virulence thereof, may crowd out and destroy some of the pathogenic microbiological soil population, e.g. those fungi responsible for seed rot. Accordingly, the use of fungicides, with their deleterious side effects, may be avoided with the seed dressing of this invention.

Plants grown in the presence of the seed dressing according to the invention result in much improved crop yields, crop quality and plant characteristics. In particular, the growing plants have leaves disposed in a more erect position ("pineapple effect"), which means they are much more effective in photosynthesis. The volume of the plant is much greater, at any given stage of growth, and the phosphorus content of the leaves is significantly higher. This indicates that the plant is more efficiently utilizing the phosphorus naturally present in the soil to derive its own phosphorus growth requirement from the ground, through the mycorrhizal activity, to the extent that a phosphorus-containing fertilizer does not need to be applied in many instances. With this invention, there is also a reduction or elimination of primary tillage, as each field would become "established" with the correct mycorrhizal population. Any ploughing activity tends to destroy the mycorrhiza and sterilize the soil. This is extremely important in terms of erosion control.

The invention is further illustrated in the following specific examples.

EXAMPLE 1

The seeds of two varieties of corn, namely DeKalb 461 and DeKalb 1044 were coated with seed dressing material according to the invention and compared with controls.

The planting soil was a clay loam, previously used for soybean growth. No primary tillage was undertaken. Seeds were treated with 100 mg of GTF chromium, in a carrier, per acre. Planting took place on May 10, 1986.

During the plant growth, observations were made, and "silking" at a certain date was recorded. Three replicate samples were measured in each case, from different locations, and totalled. Silking indicates the coming into flower of the plant—the greater the number of silks, the greater the maturity of the plant. These results are shown in Table 1 below and show variety response in the time it takes to silk.

TABLE 1

| Variety | Measurement Date | Silked Plants | Non-Silked Plants | Silked Non-Silked |
|---|---|---|---|---|
| Dek 461 | Aug. 2 | 34 | 235 | 1:7 |

TABLE 1-continued

| Variety | Measurement Date | Silked Plants | Non-Silked Plants | Silked Non-Silked |
|---|---|---|---|---|
| (control) | | | | |
| Dek 461 (treated) | Aug. 2 | 156 | 138 | 1:1 |
| Dek 1044 (control) | Aug. 24 | 176 | 71 | 2.5:1 |
| DeK 1044 (treated) | Aug. 24 | 125 | 152 | 1:1 |

EXAMPLE 2

The plants grown according to Example 1 were harvested Dec. 1, 1986, and tested for grain yield (in bushels per acre) by determining the ear weights and moisture contents thereof. The harvested grain was also analyzed for zinc content. Again three replicates from different locations were taken and totalled. The yield was measured at a moisture content of 15.5%. The results are given below in Table 2.

TABLE 2

| Variety | Total Ear Wt. (Kg) | Yield B/A at 15.5% | Avg. Moisture Content % | Zinc (ppm) |
|---|---|---|---|---|
| Dek 461 (control) | 31.6 | 140 | 17.0 | 22 |
| Dek 461 (treated) | 37.1 | 166 | 15.8 | 29 |
| Dek 1044 (control) | 37.3 | 160 | 21 | no difference |
| DeK 1044 (treated) | 44.8 | 186 | 21 | no difference |

Thus, the treatment with the seed dressing of this invention is responsible for a 16-18% yield increase in these corns, and about a 30% increase in zinc content with DeK 461. The lower moisture content in the case of 461 is also noteworthy, as indicating better mold resistance. Both in terms of its growth rate to maturity (as shown by silking reported in Example 3) and zinc uptake, the variety DeK 461 responds better to the invention than DeK 1044. However, the increase in yield is demonstrated by both varieties. The moisture difference from 17.0% to 15.8% on December 1st means the treated corn could be sold or stored as dry from the field. The control would have to have a drying fee.

EXAMPLE 3

Corn seeds were planted in seed pots in the presence and absence of the seed dressing material according to the invention. The roots of the corn plants were then examined for surrounding hair growth.

In the control experiment, where no seed dressing had been applied to the germinating seeds, the roots were bald, white and hairless, and had no soil clinging to them.

In the trial experiment, where seed dressing had been applied to the germinating seeds, the roots were covered with root hairs and contained abundant soil clinging to the roots. The adhering soil is the formation of soil structure.

EXAMPLE 4

Corn seeds were grown in the presence and absence of the seed dressing material according to the invention, harvested, and the leaves of the plants analyzed for the trace element phosphorus.

In a first control experiment, the corn was planted and grown in a soil in which corn had previously been grown. In a second control experiment, the corn was planted and grown in a soil to which crop rotation had been applied, the previous crop having been soybeans. In the first trial experiment, (experiment A), the soil was in accordance with the first control experiment but the seeds were treated with the seed dressing material in accordance with this invention. In the second trial experiment, (experiment B), the soil was in accordance with the second control experiment but the seeds were treated with the seed dressing material in accordance with this invention.

The seeds were all planted at the same time, and grown to maturity, then harvested, Leaves from the plants were separated, lyophilized and ground to powder, then subjected to Nuclear Activation Analysis (NAA), to determine the quantity of phosphorus therein. NAA analysis is a recognized analytical technique wherein a sample of material is placed inside a nuclear reactor, irradiated, and subsequently tested for re-irradiation.

TABLE 4

| | Control 1 | Control 2 | Experiment A | Experiment B |
|---|---|---|---|---|
| Phosphorus content mg/g | 3.71 | 2.18 | 5.54 | 6.98 |

As indicated in Table 4, there is a 149% increase in phosphorus levels in the trial group over the controls in corn grown on continuous corn soil, and a 320% increase in phosphorus levels in the trial group over the controls in corn grown in soybean soil.

EXAMPLE 5

Twelve varieties of corn seed were set out in a modified Latin square of three replicates each and treated with the seed dressing material in accordance with the invention (*Coprinus comatus* spores, GTF chromium concentrate, legume-growth-factor innoculum, corn starch) and three not treated (control). The corn was planted in a soil in which corn had previously been grown. No phosphorus or potassium fertilizer was added to the soil but nitrogen was applied in the form of $NH_3$. The plot was manured using liquid manure. Kernels from the mature corn plants were analyzed for chromium content using a "dry-ashing" technique and then Nuclear Activation Analysis. Dry ashing is a state of the art technique in which the sample material is oven-dried in polyethylene containers and then heated in a muffle furnace at 450° C. Dry-ashing removes carbon from the samples and thus greatly improves the accuracy of chromium determination (see Vuori and Kumpulainen, 1987). The test results are indicated in Table 5 below.

TABLE 5

| | Chromium level in ppm | |
|---|---|---|
| Seed variety | Treated | Control |
| DeK 397 | 1.10 | .55 |
| DeK 415 | .66 | .44 |
| DeK 524 | 1.00 | .67 |
| DeK 362 | .73 | .16 |
| DeK 437 | .37 | .20 |
| DeK 445 | .25 | .13 |

TABLE 5-continued

| Seed variety | Chromium level in ppm | |
| --- | --- | --- |
| | Treated | Control |
| DeK 484 | trace | .31 |
| Golden Harvest 1646 | .27 | .36 |
| Golden Harvest 1826 | 1.20 | .41 |
| Golden Harvest 2300 | .53 | .40 |
| Golden Harvest 725 | .99 | .42 |
| Golden Harvest 2344 | .57 | .18 |

MAXIMUM ERROR = +/− .07
MINIMUM ERROR = +/− .04

As indicated in Table 5, ten of the twelve varieties of corn analyzed measured higher in chromium content for treated samples as compared with untreated samples.

I claim:

1. A seed dressing material effective in enhancing the growth of and trace element uptake in corn plants, said material comprising effective amounts of fungal spores of the species *Coprinus comatus* and GTF chromium.

2. A seed dressing material effective in enhancing the growth of and trace element uptake in corn plants, said material comprising effective amounts of fungal spores of the species *Coprinus comatus*, GTF chromium and yeast.

3. The seed dressing material of claim 2, wherein said yeast is brewer's yeast or baker's yeast.

4. The seed dressing material of claim 2, wherein said yeast is of the genus Saccharomyces.

5. The seed dressing material of claim 2, wherein said yeast is *Saccharomyces cerevisiae*.

6. The seed dressing material of claim 2 further comprising an enzyme, said enzyme being selected from the group consisting of amylase, protease, cellulase and combinations of two or more of said enzymes.

7. The seed dressing material of claim 2 further comprising an energy source for said yeast.

8. The seed dressing material of claim 1 adapted for treatment of about 25,000 corn seeds or a multiple thereof, and comprising, per 25,000 seeds to be treated, about 200–300 million *Coprinus comatus* fungal spores, and from about 50–100 grams of GTF chromium concentrate containing 2,000 milligrams of GTF chromium per gram.

9. The seed dressing material of claim 2 adapted for treatment of about 25,000 corn seeds or a multiple thereof, and comprising, per 25,000 seeds to be treated, about 200–300 million *Coprinus comatus* fungal spores, and from about 50–100 grams of GTF chromium concentrate containing 2,000 milligrams of GTF chromium per gram.

10. A process for enhancing the growth of corn plants comprising treating corn seeds with a seed dressing material according to claim 1.

11. A process for enhancing the growth of corn plants comprising treating corn seeds with a seed dressing material according to claim 2.

12. A method of enhancing trace mineral uptake or growth of a corn crop, comprising the steps of applying, prior to planting, a seed dressing material according to claim 1 to seeds of the corn crop.

13. A method of enhancing trace mineral uptake or growth of a corn crop, comprising the steps of applying, prior to planting, a seed dressing material according to claim 2 to seeds of the corn crop.

* * * * *